US005442139A

United States Patent [19]

Hagerty

[11] Patent Number: 5,442,139

[45] Date of Patent: Aug. 15, 1995

[54] INSULATED MOUNTING SUPPORT FOR LADDER-LINE

[75] Inventor: James D. Hagerty, Tiverton, R.I.

[73] Assignee: The United States of America as represented by the Secretary of the Navy, Washington, D.C.

[21] Appl. No.: 127,184

[22] Filed: Sep. 27, 1993

[51] Int. Cl.[6] .......... H02G 15/007

[52] U.S. Cl. .......... 174/138 R; 174/139

[58] Field of Search .......... 174/96, 97, 98, 99 R, 174/101, 139, 140 S, 168, 138 R, 70 C, 68.1, 52.1, 117 F

[56] References Cited

U.S. PATENT DOCUMENTS 3,128,331 4/1964 Groom .......... 174/139 X
4,528,616 7/1985 Koppensteiner .......... 174/52.1 X

FOREIGN PATENT DOCUMENTS 330977 5/1991 Japan .......... H01G 9/05

*Primary Examiner*—Kristine L. Kincaid
*Assistant Examiner*—D. A. Tone
*Attorney, Agent, or Firm*—Michael J. McGowan; Prithvi C. Lall; Michael F. Oglo

[57] ABSTRACT

An insulated mounting support is provided for installation near a feedpoint of a ladder-line transmission line. A first plate of electrical insulator material has a face from which two bosses extend, and has opposing sides abutting the face from which first and second appendages extend. A second plate of electrical insulator material has two recesses in a face thereof for mating engagement with the two bosses. The two bosses are maintained in a spaced apart relationship in correspondence with two cutouts provided in the transmission line. When the first plate and second plate are sandwiched about the transmission line near the feedpoint, the two bosses extend through the two cutouts and engage the two recesses. In this way, tension in the transmission line is absorbed by the two bosses. In addition, the first and second appendages respectively coact with first and second conducting wires extending from the transmission line at the feedpoint. In this way, tension applied to the first and second appendages is absorbed in the first plate.

12 Claims, 4 Drawing Sheets

INSULATED MOUNTING SUPPORT FOR LADDER-LINE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The present invention relates generally to insulated supports for transmission lines, and more particularly to an insulated mounting support for a ladder-line transmission line.

2. Description of the Prior Art

In high frequency radio systems (e.g., 3–30 MHz), coax cable or "ladder-lines" are used to transfer power from a transmitter to an antenna's radiating element. Commercially available "ladder-line" transmission line provides a balanced feed system, is the least lossy transmission line in terms of power, and is the least expensive of all power transfer alternatives. The conventional "ladder-line" consists of two spaced apart parallel conductors that are separated and encased by a dielectric material. The dielectric material is provided with a number of spaced apart cutouts along the transmission line, the size, shape and spacing of which determines the characteristic impedance of the transmission line.

For example, as shown in FIG. 1, a conventional 450-ohm "ladder line" transmission line 10 has two spaced apart parallel conducting wires 11 and 12 encased in and separated by a dielectric material 14. Dielectric material 14 is provided with a plurality of spaced apart rectangularly shaped cutouts 16 that yield 450-ohm characteristic impedance. Wires 11 and 12 are exposed and extend from transmission line 10 at one end thereof. This end of transmission line 10 is commonly referred to as the feedpoint. In the prior art, attachment of the feedpoint of transmission line 10 to an antenna radiator 100 is as follows. The exposed portion of wires 11 and 12 are fed through holes 201 and 202, respectively, of an insulator body 200. Each of wires 11 and 12 is then twisted with respective radiator wires 101 and 102 at respective twist points 151 and 152, and soldered in place.

The problem with this system is that tension on transmission line 10 places a strain on wires 11 and 12 at insulator body 200. Over a period of time, movement of transmission line 10 causes fatigue in and eventual breakage of wires 11 and 12 thereby requiring repair. Such repair of the broken wires may be difficult if insulator body 200 is maintained in a limited access location, e.g., a tall antenna tower.

SUMMARY OF THE INVENTION

Accordingly, it is an object of the present invention to provide an insulator mounting support for a "ladder-line" transmission line that serves as strain relief for tension in the transmission line thereby protecting the transmission line's conducting wires.

Other objects and advantages of the present invention will become more obvious hereinafter in the specification and drawings.

In accordance with the present invention, an insulated mounting support is provided for installation near a feedpoint of a ladder-line transmission line. A T-shaped first plate of electrical insulator material has a central longitudinal portion and a cross-bar portion. The cross-bar portion is provided with holes at opposing ends thereof. Two bosses extend from a face of the central longitudinal portion. The two bosses are maintained in a spaced apart relationship in correspondence with two cutouts provided in the transmission line. A second plate of electrical insulator material has two recesses in a face thereof for mating engagement with the two bosses. When the central longitudinal portion of the first plate and the second plate are sandwiched about the transmission line near the feedpoint, the two bosses extend through the two cutouts for mating engagement with the two recesses. In this way, tension in the transmission line is absorbed by the two bosses. Each of the holes at opposing ends of the cross-bar portion coact with a corresponding first and second conducting wire extending from the transmission line at the feedpoint. In this way, tension applied to the cross-bar portion is absorbed by the central longitudinal portion.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 2:
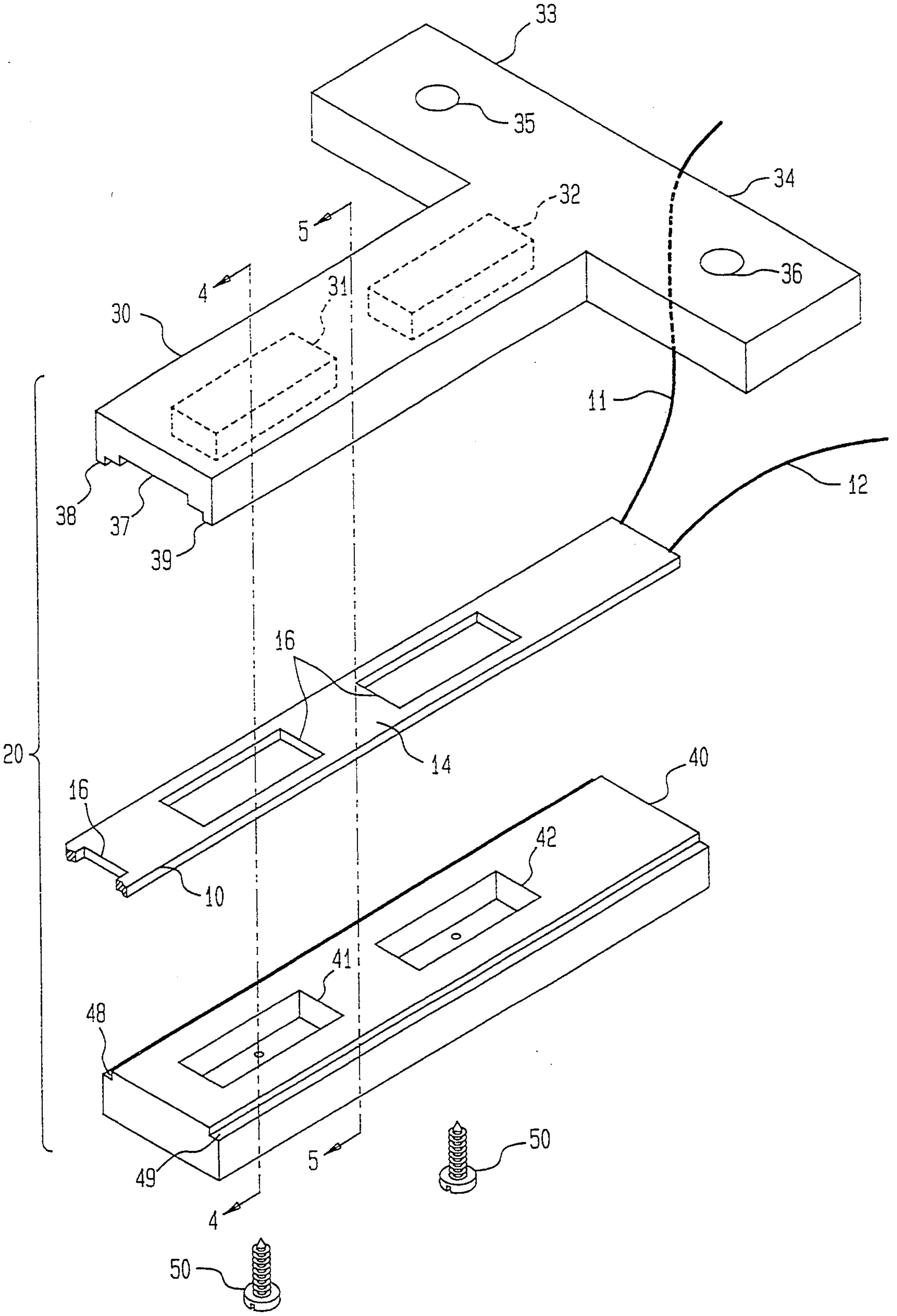
FIG. 2 is an exploded perspective view of the insulated mounting support for installation near the feedpoint of a "ladder-line" transmission line in accordance with a preferred embodiment of the present invention.
Figure 3:
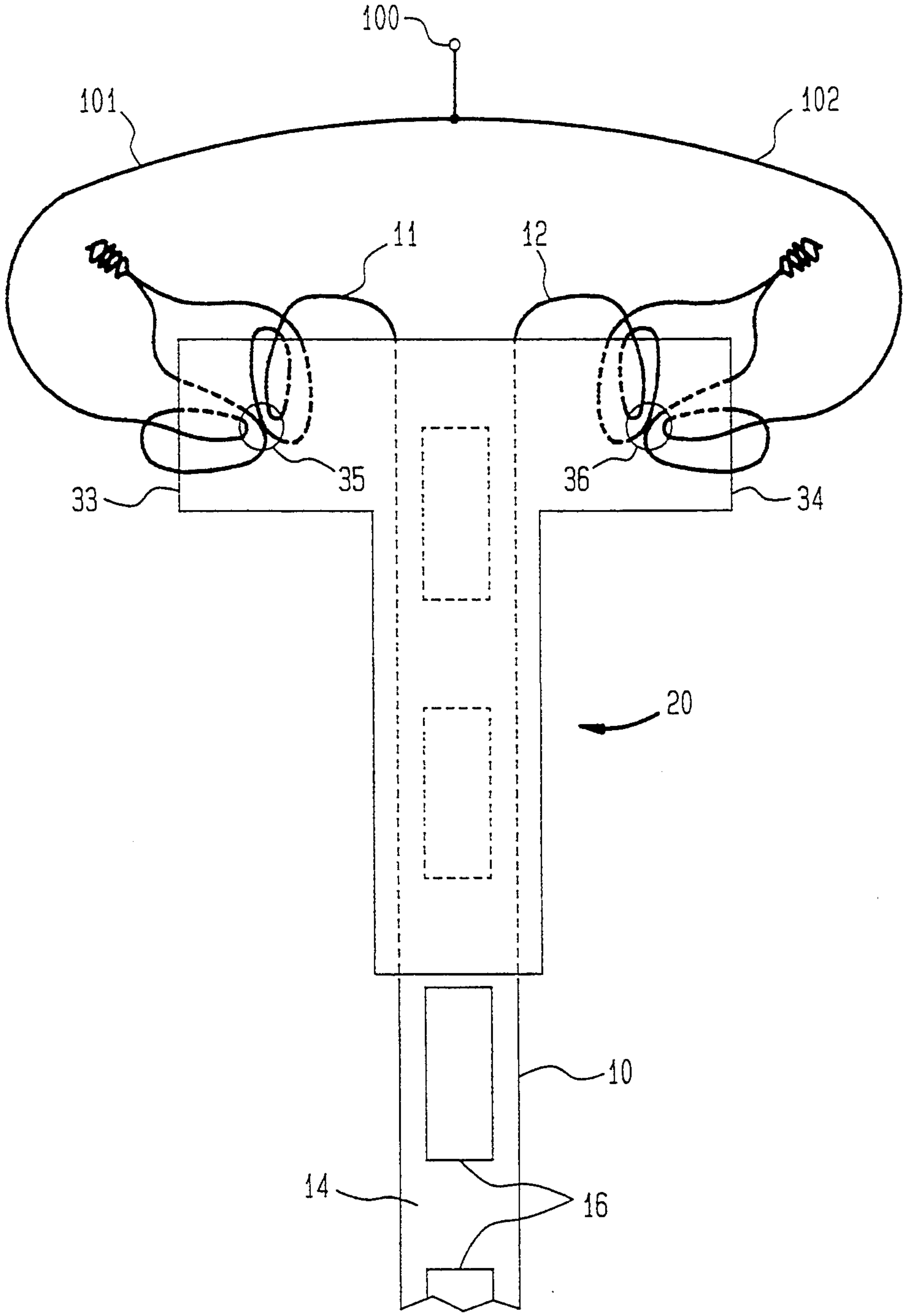
FIG. 3 is a plan view of the insulated mounting support of the present invention used in conjunction with a "ladder-line" transmission line connected at its feedpoint to an antenna's radiator wires.
Figure 4:
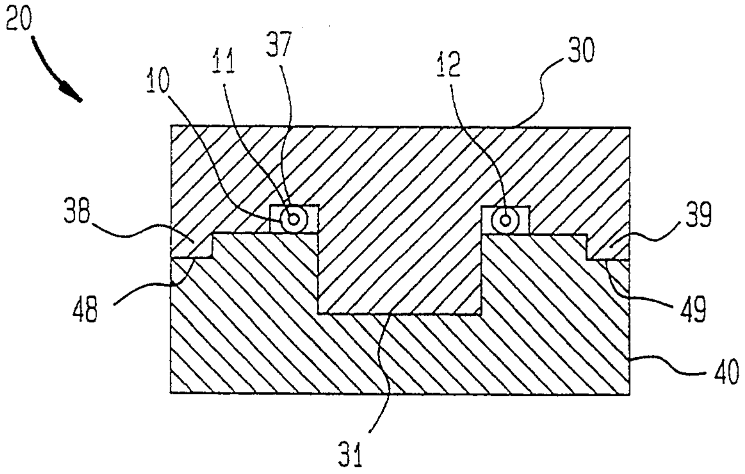
FIG. 4 is a cross-sectional view along lines 4—4 of FIG. 2.
Figure 5:
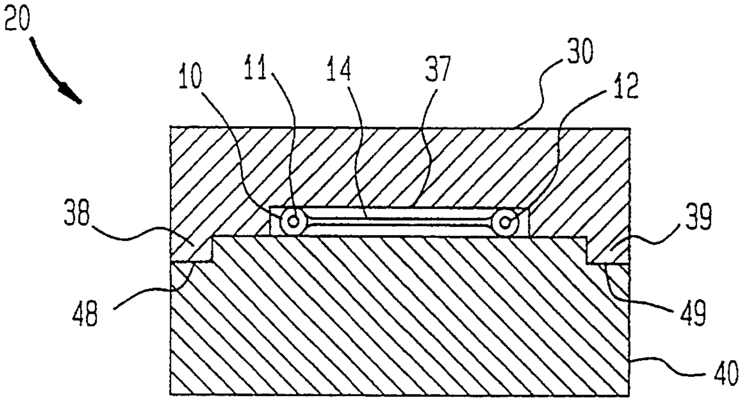
FIG. 5 is a cross-sectional view along lines 5—5 of FIG. 2.

Referring now to the drawings, and more particularly to FIGS. 2–5, various views are shown of a preferred embodiment insulated mounting support 20 in accordance with the present invention. FIG. 2 is an exploded perspective view of the insulated mounting support for installation near the feedpoint of a "ladder-line" transmission line. FIG. 3 is a plan view of the insulated mounting support installed on a "ladder-line" transmission line. In order to provide a clearer understanding of the relationships between several of the invention's features, cross-sectional views along lines 4—4 and 5—5 of FIG. 2 are provided in FIGS. 4 and 5, respectively. Common reference numerals have been used for common elements.

Figure 1:
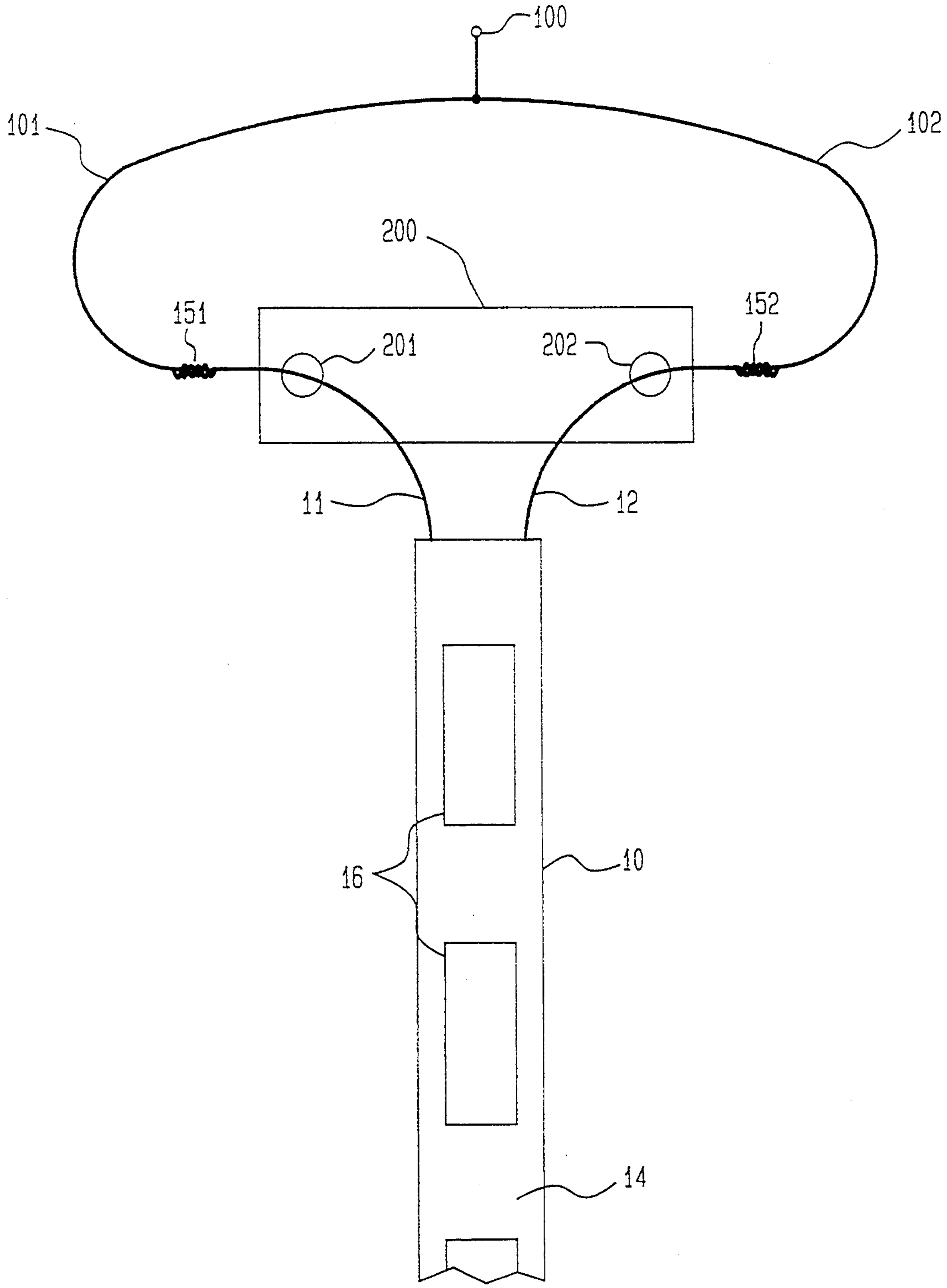
FIG. 1 (PRIOR ART)
FIG. 1 is a plan view of a 450-ohm "ladder-line" transmission line attached at its feedpoint to an antenna's radiator wires at an insulator body in accordance with the prior art.

Mounting support 20 is located near the feed point of transmission line 10 and includes a first plate 30 and a second plate 40 sandwiched about transmission line 10. Transmission line 10 is a "ladder-line" having cutouts 16 in dielectric material 14 identical to that described above with reference to FIG. 1. By way of illustrative example, transmission line 10 is a 450-ohm "ladder-line"

transmission line having rectangular cutouts 16. However, it is to be understood that the present invention may be easily adapted to other "ladder-line" configurations having cutouts sized, shaped and located to yield a different characteristic impedance. Such adaptations will be readily recognized by one of ordinary skill in the art without departing from the inventive aspects of the present invention.

First plate 30 has two bosses 31 and 32 extending from plate 30 as shown. Bosses 31 and 32 are rectangular in shape, are sized slightly smaller than cutouts 16, and are located such that they are aligned with cutouts 16. Second plate 40 has recesses 41 and 42 formed therein. Recesses 41 and 42 are rectangular in shape, are sized slightly larger than bosses 31 and 32, and are located such that they are aligned with cutouts 16 and bosses 31 and 32. When plates 30 and 40 are sandwiched about transmission line 10, bosses 31 and 32 pass through cutouts 16 and engage recesses 41 and 42, respectively. Plates 30 and 40 may be fastened together by screws 50 passing through recesses 41 and 42 and into bosses 31 and 32. Plates 30 and 40 may also be epoxied together or held together in any conventional manner.

Extending from either side of first plate 30 are wings 33 and 34 having respective holes 35 and 36 passing therethrough. Once plates 30 and 40 are fastened together, the exposed portion of wires 11 and 12 are looped through holes 35 and 36, respectively, as shown in the plan view of FIG. 3. After looping through holes 35 and 36, wires 11 and 12 may be twisted and soldered together with radiator wires 101 and 102 from antenna 100. Wires 101 and 102 are first preferably looped through holes 35 and 36 as shown. When tension is applied along the length of transmission line 10, the strain is transferred from dielectric material 14 to mounting support 20 via bosses 31 and 32. When tension is applied to wings 33 and 34 via the antenna's radiator wires 101 and 102, strain is transferred to mounting support 20 via wings 33 and 34. Thus, no matter where tension is applied (i.e., before or after the feedpoint), wires 11 and 12 remain tension-free thereby insuring their integrity over a long period of time.

To further insure the integrity of wires 11 and 12, first plate 30 may be provided with a longitudinal recess 37 running the full length of plate 30. Longitudinal recess 37 is sized to receive the width and height of transmission line 10. In this way, when plates 30 and 40 are fastened together, fastening pressure is applied only within mounting support 20 and not on transmission line 10 and its wires 11 and 12. If a watertight seal is required, first plate 30 may include longitudinal ridges 38 and 39 for mating engagement with longitudinal notches 48 and 49 extending the length of second plate 40.

Plates 30 and 40 are typically made from material that is electrically insulative such as plastic (or ceramic where weight is not a limiting factor). The particular choice of plastic will vary depending on the amount of power handled by the transmission line. If screws 50 are used to fasten mounting support 20, plastic screws are preferred to minimize impedance discontinuity. Along these same lines, it is desirable to minimize the number of obstructions passing through the transmission line's cutouts while maximizing the strength characteristics of the mounting support. Balancing these two criteria has resulted in a preferable design using two bosses as described above for the preferred embodiment. However, additional bosses may be employed in high stress environments.

The particular fabrication of the mounting support of the present invention is not a limitation thereof. For example, with respect to first plate 30, bosses 31 and 32 and wings 33 and 34 may be fabricated as a single integral unit. In addition, while first plate 30 and second plate 40 are shown as two individual elements, first plate 30 and second plate 40 might alternatively be joined in a hinged fashion along a longitudinal edge (e.g., where longitudinal ridge 38 meets longitudinal notch 48).

The advantages of the present invention are numerous. The insulated mounting support clamps onto a "ladder-line" transmission line at its feedpoint. By utilizing male/female mating sections in cooperation with the "ladder-line" design, strain relief is provided for the transmission line's conducting wires.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An insulated mounting support assembly, comprising:

a transmission line having two spaced apart parallel conductors encased and separated by a dielectric material to a feedpoint of said transmission line where said two spaced apart parallel conductors encased and separated by said dielectric material extend from said transmission line is first and second wires, said dielectric material having a plurality of spaced apart cutouts located between said conductors;

a T-shaped first plate of electrical insulator material having a central longitudinal portion and a cross-bar portion, said central longitudinal portion having an open-ended longitudinal recess extending along the entire length thereof and being sized to receive the height and width of said transmission line, said cross-bar portion being provided with holes at opposing ends thereof;

at least two bosses extending from said longitudinal recess of said central longitudinal portion, said at least two bosses maintained in a spaced apart relationship in correspondence with at least two cutouts from said plurality of spaced apart cutouts;

a second plate of electrical insulator material having at least two recesses in a face thereof for mating engagement with said at least two bosses, wherein said central longitudinal portion of said T-shaped first plate and said second plate are sandwiched about a portion of said transmission line, said at least two bosses extending through said at least two cutouts for said mating engagement with said at least two recesses such that said portion of said transmission line residing in said longitudinal recess is engaged without pressure thereon between said T-shaped first plate and said second plate, wherein tension in said transmission line is absorbed by said at least two bosses; and each of said holes at opposing ends of said cross-bar portion serving as a loophole for one of said first and second wires extending from said transmission line at said feedpoint, wherein tension applied to said cross-bar portion via either of said first and second wires is absorbed by said T-shaped first plate.

2. An insulated mounting support assembly as in claim 1 further comprising means for fastening said central longitudinal portion of said T-shaped first plate to said second plate as said central longitudinal portion of said T-shaped first plate and said second plate are sandwiched about said portion of said transmission line.

3. An insulated mounting support assembly as in claim 1 wherein said electrical insulator material is plastic.

4. An insulated mounting support assembly as in claim 1 wherein each of said at least two cutouts is rectangular and wherein each of said at least two bosses is rectangular.

5. An insulated mounting support assembly as in claim 1 wherein said T-shaped first plate and said second plate further include means for forming a seal with one another when said T-shaped first plate and said second plate are sandwiched about said portion of said transmission line.

6. An insulated mounting support assembly, comprising:

a transmission line having two spaced apart parallel conductors encased and separated by a dielectric material up to a feedpoint of said transmission line where said two spaced apart parallel conductors encased and separated by said dielectric material extend from said transmission line as first and second wires, said dielectric material having a plurality of spaced apart cutouts located successively along the length of said transmission line between said conductors;

a first plate of electrical insulator material having a face formed with an open-ended longitudinal recess extending along the entire length thereof from which at least two bosses extend, said longitudinal recess sized to receive the height and width of said transmission line, said at least two bosses located successively along the length of said longitudinal recess and maintained in a spaced apart relationship in correspondence with at least two of said plurality of spaced apart cutouts, said at least two bosses shaped to match said at least two of said plurality of spaced apart cutouts, said at least two bosses sized to fit through said at least two of said plurality of spaced apart cutouts, said first plate further having opposing sides substantially perpendicular to said face from which first and second appendages extend, each of said first and second appendages having a hole extending therethrough;

a second plate of electrical insulator material having at least two recesses in a face thereof located successively along the length of said second plate for mating engagement with said at least two bosses when said first plate and said second plate are sandwiched about a portion of said transmission line, said at least two bosses extending through said at least two of said plurality of spaced apart cutouts for said mating engagement with said at least two recesses, said portion of said transmission line residing in said longitudinal recess;

means for applying fastening pressure to said first plate and said second plate sandwiched about said portion of said transmission, said portion of said transmission line residing in said longitudinal recess being free from said fastening pressure, wherein tension in said transmission line is transferred from said portion of said transmission line to said first plate and said second plate via said at least two bosses; and each said hole associated with said first and second appendages serving as a loophole for one of said first and second wires extending from said transmission line at said feedpoint, wherein tension applied to said first and second appendages via either of said first and second wires is absorbed by said first plate.

7. An insulated mounting support assembly as in claim 6 wherein said transmission line is a 450-ohm ladder-line transmission line.

8. An insulated mounting support assembly as in claim 6 further comprising means for fastening said first plate to said second plate as said first and second plates are sandwiched about said portion of said transmission line.

9. An insulated mounting support assembly as in claim 6 wherein said electrical insulator material is plastic.

10. An insulated mounting support assembly as in claim 6 wherein each of said corresponding ones of said plurality of spaced apart cutouts is rectangular and wherein each of said at least two bosses is rectangular.

11. An insulated mounting support assembly as in claim 6 wherein said first plate further includes a plurality of ridges and said second plate includes a corresponding plurality of notches for mating engagement with said plurality of ridges for forming a seal when said first and second plates are sandwiched about said portion of said transmission line.

12. An insulated mounting support assembly as in claim 6 wherein said at least two bosses and said first and second appendages are integral with said first plate.

* * * * *